United States Patent [19]

Makino et al.

[11] 4,370,290

[45] Jan. 25, 1983

[54] PROCESS FOR PRODUCING AROMATIC POLYIMIDE FILAMENTS

[75] Inventors: Hiroshi Makino; Yoshihiro Kusuki; Takashi Harada; Hiroshi Shimazaki, all of Ichihara, Japan

[73] Assignee: Ube Industries, Ltd., Japan

[21] Appl. No.: 261,979

[22] Filed: May 8, 1981

[30] Foreign Application Priority Data

May 9, 1980 [JP] Japan ................................ 55-60516

[51] Int. Cl.$^3$ .............................................. D01F 6/00
[52] U.S. Cl. .................................. 264/184; 264/203; 264/205; 264/210.8
[58] Field of Search ............. 264/184, 203, 205, 210.8

[56] References Cited

U.S. PATENT DOCUMENTS

| | | | |
|---|---|---|---|
| 3,929,691 | 12/1975 | Avard | 264/205 |
| 3,961,009 | 6/1976 | Yoda et al. | 264/205 |
| 3,985,934 | 10/1976 | Farrissey et al. | 264/184 |
| 4,214,071 | 7/1980 | Alvino et al. | 264/205 |

FOREIGN PATENT DOCUMENTS

| | | | |
|---|---|---|---|
| 50-48217 | 4/1975 | Japan | 264/184 |
| 50-64520 | 5/1975 | Japan | 264/184 |
| 50-64521 | 5/1975 | Japan | 264/184 |
| 50-94224 | 7/1975 | Japan | 264/184 |
| 50-29047 | 9/1975 | Japan | 184/ |
| 55-16925 | 2/1980 | Japan | 184/ |
| 1381181 | 1/1975 | United Kingdom | 264/184 |
| 332147 | 4/1972 | U.S.S.R. | 264/178 |

*Primary Examiner*—Jay H. Woo
*Attorney, Agent, or Firm*—Finnegan, Henderson, Farabow, Garrett & Dunner

[57] ABSTRACT

Aromatic polyimide fibers having an enhanced mechanical strength are produced by a process comprising the steps of: preparing a spinning dope solution of at least one aromatic polyimide having 90 molar % or more of a recurring unit of the formula (I):

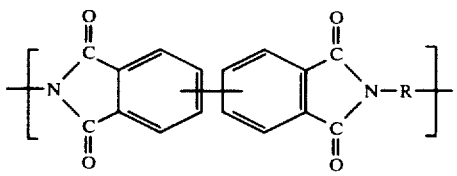

wherein R is a divalent aromatic radical, in a phenolic solvent; converting the dope solution into at least one filamentary stream thereof; solidifying the filamentary dope solution stream by removing the solvent therefrom to provide at least one undrawn filament, and; drawing the undrawn filament at a temperature of 20° to 600° C. at a draw ratio of 1.5 to 5.0.

20 Claims, 2 Drawing Figures

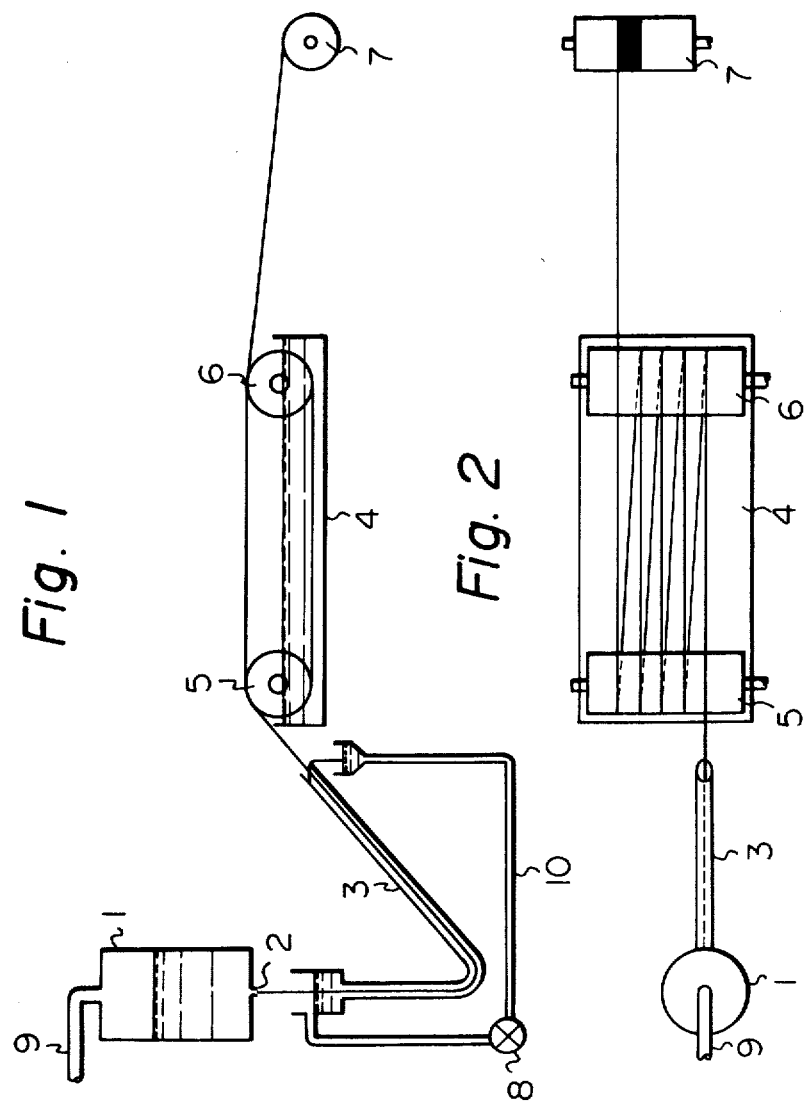

PROCESS FOR PRODUCING AROMATIC POLYIMIDE FILAMENTS

FIELD OF THE INVENTION

The present invention relates to a process for producing aromatic polyimide filaments. More particularly, the present invention relates to a process for producing aromatic polyimide filaments having an enhanced mechanical strength.

BACKGROUND OF THE INVENTION

Various methods for producing an aromatic polyimide fiber have been heretofore proposed. Particularly, it is well known that the aromatic polyimide filaments can be prepared by a method such that an aromatic polyamic acid resin, which is a precursory polymer of the corresponding polyimide resin, is dissolved in an organic polar solvent, to prepare a dope solution; the dope solution is subjected to a spinning procedure; the polyamic acid in the resultant filaments is converted into the corresponding polyimide, and; then, the resultant polyimide filaments are subjected to a drawing procedure, as disclosed in Japanese Patent Publication Nos. 55-16925 and 42-2936.

However, this conventional method requires the conversion of the polyamic acid into the corresponding polyimide in the course of the filament production. The conversion procedure results in the production of water. Therefore, it is necessary to control the conversion procedure carefully. For this reason, it is difficult to stably produce the polyimide filaments with high reliability.

Moreover, Japanese Patent Application Laid-open No. 50-64522 discloses a special method for producing an aromatic polyimide filament which method comprises dissolving a benzophenone tetracarboxylic acid type aromatic copolyimide in an organic bipolar solvent to prepare a spinning dope solution; extruding the dope solution through a spinneret to form filamentary streams of the dope solution; introducing the filamentary streams into a specific coagulating liquid, and; subjecting the coagulated filaments to a drawing procedure at an elevated temperature.

However, the copolyimide filaments produced by the above-mentioned method are unsatisfactory in mechanical strength thereof.

The inventors of the present invention conducted extensive studies to develop a process for producing aromatic polyimide filaments having a high mechanical strength which is free from the above mentioned disadvantages of the conventional methods. As a result, the invention of the present invention found that when a biphenyl tetracarboxylic acid type aromatic polyimide is dissolved in a solvent consisting mainly of a phenolic compound to prepare a spinning dope solution and the dope solution is subjected to a spinning procedure, the polyimide filaments having an enhanced mechanical strength can be produced. Thus, the inventors of the present invention accomplished this invention.

SUMMARY OF THE INVENTION

An object of the present invention is to provide a process for producing aromatic polyimide filaments having a enhanced mechanical strength.

Another object of the present invention is to provide a process for producing aromatic polyimide filaments directly from the corresponding aromatic polyimide material.

The above-described objects can be attained by the process of the present invention which comprises the steps of:

(1) preparing a spinning dope solution of a polymer material consisting of at least one aromatic polyimide hving at least 90 molar % of a recurring unit of the formula (I):

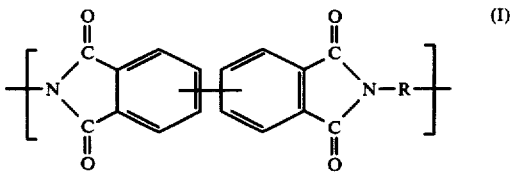

wherein R represents a divalent aromatic radical, in a solvent comprising, as a main component thereof, at least one phenolic compound;

(2) extruding the spinning dope solution through at least one spinning hole to form at least one filamentary stream thereof;

(3) solidifying the filamentary stream of the spinning dope solution to provide at least one undrawn aromatic polyimide filament, and;

(4) drawing the undrawn filament at a temperature of from 20° to 600° C. at a draw ratio of from 1.5 to 5.0.

The process of the present invention requires no imidization procedure during the spinning operation which is esseantial for conventional methods using a dope solution comprising a polyamic acid. Since no production of water is accordingly encountered in the process of the present invention, the spinning operation is easy to control, which makes it possible to produce high-performance aromatic polyimide filaments with high reproducibility.

The aromatic polyimide filaments obtained by the process of the present invention exhibit a high tensile strength of at least 6 g/d, and, sometimes, a tensile strength of 10 g/d or more. In addition, the aromatic polyimide filaments of the present invention exhibit very excellent resistance to chemicals and heat.

BRIEF DESCRIPTION OF THE DRAWINGS

FIG. 1 is a side view of an apparatus for producing an undrawn aromatic polyimide filament yarn in accordance with the process of the present invention, and FIG. 2 is a plane view of the apparatus shown in FIG. 1.

DETAILED DESCRIPTION OF THE INVENTION

The term "degree of imidization" used herein refers to a proportion in percent of the real amount of imide bonds existing in a polymeric chain of an aromatic polyimide to the theoretical amount of the imide bonds theoretically possible to exist in the polymeric chain. The amount of the imide bonds can be determined by means of an infrared absorption spectrum analysis. That is, the amount of the imide bonds is determined from height of absorption peaks at 1780 cm$^{-1}$ and 1720 cm$^{-1}$, and the amount of amide bonds is determined from height of absorption peaks at 3300 cm$^{-1}$ and 1640$^{-1}$.

The aromatic polyimide usable for the process of the present invention should have a degree of imidization of at least 90% as defined above.

If the degree of imidization of the aromatic polyimide to be used for the present invention is less than 90%, the resultant filaments will exhibit a poor mechanical strength and heat-resistance.

In the process of the present invention, the polymer material to be converted into filament or filaments, consists of at least one aromatic polyimide having at least 90 molar %, preferably, at least 90 molar %, of a recurring unit of the formula (I):

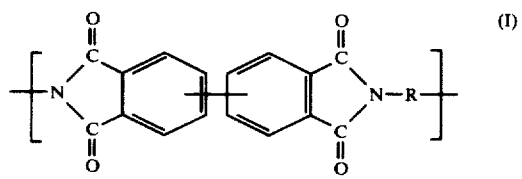

wherein R represents a divalent aromatic radical, and is soluble in the solvent comprising, as a main component thereof, at least one phenolic compound. The divalent aromatic radical represented by R may be a residue of an aromatic diamine of the formula (II): $H_2N-R-NH_2$, from which two amino groups are excluded. If the content of the recurring unit of the formula (I) is less than 90%, the resultant filaments will exhibit an unsatisfactory mechanical strength and heat resistance.

The aromatic polyimide preferably has a high molecular weight and, therefore exhibits a logarithmic viscosity of from 0.3 to 7.0, more preferably from 0.4 to 5.0, still more preferably from 0.5 to 4.0, determined at a concentration of 0.5 g per 100 ml of a mixture solvent of 4 parts by volume of P-chlorophenol and 1 part by volume of O-chlorophenol at a temperature of 30° C.

The aromatic polyimide can be produced by the polymerization and imidization (imide ring-cyclization) of a tetracarboxylic acid component containing at least 90 molar % at least one biphenyl tetracarboxylic acid, such as 3,3',4,4'-biphenyl tetracarboxylic acid and 2,3,3',4'-biphenyl tetracarboxylic acid, with a diamine component comprising at least one aromatic diamine of the formula (II). The polymerization and imidization operations can be carried out by any conventional process.

The aromatic polyimide usable for the process of the present invention can be prepared in the following manner. That is, a biphenyl tetracarboxylic acid component and an aromatic diamine component, which are in approximately equal molar amounts to each other, are dissolved in a organic polar solvent, for example, N-methylpyrrolidone, pyridine, N,N-dimethylacetamide, N,N-dimethylformamide, dimethyl sulfoxide, tetramethyl urea, phenol or cresol; the solution is heated at a temperature of about 80° C. or less, preferably from 0° to 60° C., so as to allow the biphenyl tetracarboxylic acid component and the aromatic diamine component to be polymerized with each other to provide a polyamic acid having a logarithmic viscosity of 0.3 or more, preferably, 0.5 to 7, determined at a concentration of 0.5 g per 100 ml of N-methyl pyrrolidone at a temperature of 30° C.; the solution of the polyamic acid in the organic polar solvent, which solution can be the above mentioned polymerization reaction mixture itself, is subjected to an imidization reaction at a temperature of from 5° to 150° C. by using an imidization accelerator consisting of at least one member selected from tertiary amine compounds such as trimethyl amine, triethyl amine and pyridine, acetic anhydride, sulfonyl chloride and carbodiimide. Otherwise, the imidization procedure may be carried out at a temperature of from 100° to 300° C., preferably, from 120° to 250° C., without using the imidization accelerator. The resultant imide polymer has a degree of imidization of 90% or more. The resultant imide polymer is isolated in the form of fine particles from the reaction mixture by means of precipitation.

In another process for producing the aromatic polyimide, the solution of the polyamic acid in the organic polar solvent, which solution has been prepared by the above mentioned process and which has a logarithmic viscosity of 0.5 or more, determined at a concentration of 0.5 g per 100 ml of N-methylpyrrolidone at a temperature of 30° C., is mixed with a large amount of a precipitating agent consisting of acetone or an alcohol, so as to allow the polyamic acid to precipitate from the solution. Otherwise, the solution of the polyamic acid is mixed with the precipitating agent while evaporating the organic polar solvent from the solution so as to allow the polyamic acid to precipitate from the reaction mixture. The polyamic acid precipitate is isolated in the form of fine particles from the reaction mixture. The isolated polyamic acid is heated at a temperature of from 150° to 300° C. until the degree of imidization of the resultant imide polymer reaches 90% or more.

In still another process for producing the aromatic polyimide, a biphenyl tetracarboxylic acid component consisting of 2,3,3',4'- and/or 3,3',4,4'-biphenyl tetracarboxylic acid and an aromatic diamine component are polymerized and imidized in a single step in a phenolic compound in the state of a liquid or melt, at a temperature of from 120° to 400° C., preferably from 150° to 300° C. This single step process is most preferable for the process of the present invention, because of the polyimide composition of the polyimide and the phenolic compound can be directly obtained and the resultant reaction mixture can be directly utilized as a spinning dope solution for the spinning operation of the present invention. In the above-mentioned processes for producing the aromatic polyimide, 3,3',4,4'-biphenyl tetracarboxylic dianhydride (hereinafter referred to as S-BPDA for brevity) and 2,3,3',4'-biphenyl tetracarboxylic dianhydride can be preferably used as a main tetracarboxylic acid component. 2,3,3',4'- and 3,3',4,4',-biphenyl tetracarboxylic acids and salts and ester derivatives thereof may be also used as the main tetracarboxylic acid component. The above mentioned biphenyl tetracarboxylic acids may be used in mixtures thereof.

The tetracarboxylic acid component may contain, in addition to the above mentioned biphenyl tetracarboxylic acids, 10 molar % or less, preferably, 5 molar % or less, of one or more other tetracarboxylic acids, for example, pyromellitic acid, 3,3',4,4',-benzophenone tetracarboxylic acid, 2,2-bis (3,4-dicarboxyphenyl) propane, bis (3,4-dicarboxyphenyl) sulfone, bis (3,4-dicarboxyphenyl) ether, bis (3,4-dicarboxyphenyl) thioether, butane tetracarboxylic acid, and anhydrides, salts and ester derivatives thereof.

The aromatic diamine of the formula: $H_2N-R-NH_2$ which is used in the above mentioned process for producing the aromatic polyimide is preferably selected from the group consisting of those of the formulae (III) and (IV):

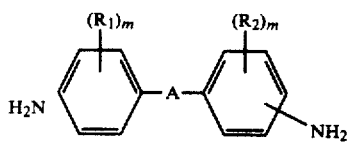

and

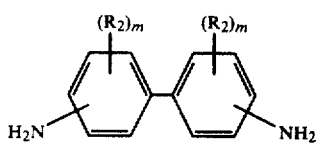

wherein $R_1$ and $R_2$ respectively, independently from each other, represent a member selected from the group consisting of hydrogen atoms, lower alkyl radicals having 1 to 3 carbon atoms and lower alkoxy radicals having 1 to 3 carbon atoms, A represents a divalent radical selected from the group consisting of —O—, —S—, —CO—, —SO$_2$—, —SO—, —CH$_2$— and —C(CH$_3$)$_2$—, and m represent an integer of from 1 to 4.

The aromatic diamines of the formula (III) may involve diphenyl ether compounds, for example, 4,4'-diaminodiphenyl ether (hereinafter referred to as DADE for brevity), 3,3'-dimethyl-4,4'-diaminodiphenyl ether, 3,3'-dimethoxy-4,4'-diaminodiphenyl ether, 3,3'-diaminodiphenyl ether and 3,4'-diaminodiphenyl ether; diphenyl thioether compounds, for example, 4,4'-diaminodiphenyl thioether, 3,3'-dimethyl-4,4'-diaminodiphenyl thioether, 3,3'-dimethoxy-4,4'-diaminodiphenyl thioether, and 3,3'-diaminodiphenyl ether; benzophenone compounds, for example, 4,4'-diaminobenzophenone and 3,3'-dimethyl-4,4'-diaminobenzophenone; diphenyl methane compounds for example, 3,3'-diaminodiphenyl methane, 4,4'-diaminodiphenyl methane (hereinafter referred to as DADM for brevity), 3,3'-dimethoxy-4,4'-diaminodiphenyl methane, and 3,3'-dimethyl-4,4'-diaminodiphenyl methane; bisphenyl propane compounds, for example, 2,2-bis (4-aminophenyl) propane and 2,2-bis (3-aminophenyl) propane; 4,4'-diaminophenyl sulfoxide; 4,4'-diaminodiphenyl sulfone; and 3,3'-diaminodiphenyl sulfone.

The aromatic diamines of the formula (IV) may involve benzidine, 3,3'-dimethyl benzidine, 3,3'-dimethoxybenzidine (ortho-dianisidine) and 3,3'-diaminobiphenyl.

The diamine component may contain, in addition to the aromatic diamine of the formula (III) or (IV), at least one another diamine compound selected from those of the formula (V) and (VI):

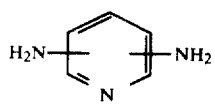

and

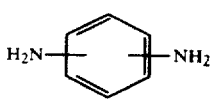

The aromatic diamines of the formula (V) may be selected from 2,6-diaminopyridine, 3,6-diaminopyridine, 2,5-diaminopyridine and 3,4-diaminopyridine.

The diamine of the formula (VI) is selected from o-, m- and p-phenylene diamines.

It is preferable that the aromatic diamine component consists of at least one member selected from the group consisting of 4,4'-diaminodiphenyl ether (DADE), 4,4'-diaminodiphenyl thioether, 4,4'-diaminodiphenyl methane (DADM), 3,3'-dimethoxy benzidine (ortho-dianisidine) (hereinafter referred to as O-DAN for brevity) and 3,3'-dimethyl benzidine.

In the process of the present invention, a solvent into which the aromatic polyimide is dissolved comprises, as a main component, at least one phenolic compound. It is preferable that the solvent consists of a phenolic compound alone. The solvent usable for the process of the present invention may contain, in addition to the phenolic compound, at least one additional solvent compatible with the phenolic compound which is selected from the group consisting of carbon disulfide, dichloromethane, trichloromethane, nitrobenzene, and O-dichlorobenzene, in an amount of 50% by weight or less, preferable, 30% by weight or less.

It is preferable that the phenolic compound usable for the process of the present invention has a melting point of about 100° C. or less, more preferably, 80° C. or less, and a boiling point under atmospheric pressure of about 300° C. or less, more preferably, 280° C. or less. Examples of the preferred phenolic compounds are monohydric phenols such as phenol, O-, m- and P-cresols, 3,5-xylenol, carvacrol and thymol, and halogenated monohydric phenols in which a hydrogen atom in the benzene nucleus of the phenol is replaced with a halogen.

The most preferable halogenated phenols for the process of the present invention are those having a melting point of about 100° C. or less and a boiling point under atmospheric pressure of about 300° C. or less and which are represented by the formula (VII):

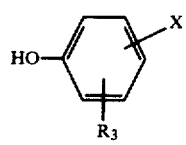

wherein $R_3$, represents a member selected from the group consisting of hydrogen atoms and alkyl radicals having 1 to 3 carbon atoms and X represents a halogen atom. In the formula (VII), it is preferable that the substituent X is located in P- or m- position to the hydroxyl group. These halogenated phenols have a high ability to dissolve the aromatic polyimide of biphenyl tetracarboxylic acid type.

The halogenated phenols usable for the process of the present invention include 3-chlorophenol, 4-chlorophenol (P-chlorophenol, hereinafter referred to as PCP for brevity), 3-bromophenol, 4-bromophenol, 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene and 4-bromo-2-hydroxytoluene.

In the process of the present invention, in the case where the aromatic polyimide is prepared by subjecting the biphenyl tetracarboxylic acid component and the aromatic diamine component to the single-step polymerization-imidization procedure in a phenolic compound in the state of a liquid on melt at a temperature of from 120° to 400° C., as is described for the production of the aromatic polyimide, the resultant polymerization reaction mixture can be directly utilized as a dope solution for the spinning operation. If necessary, the polyimide concentration or viscosity of the reaction mixture is adjusted to a desired value before being subjected to the spinning operation.

On the other hand, in the case where the aromatic polyimide is prepared as an isolated product in the form of fine particles, the polyimide composition usable for the process of the present invention can be prepared by dispersing the polyimide particles in a solvent consisting mainly of the phenolic compound while stirring the mixture and heating the dispersion to a temperature high enough to dissolve the polyimide particles in the solvent thoroughly.

In the process of the present invention, the polymer material to be dissolved in the solvent may comprise at least two types of imide polymers each having at least 90 molar % of a recurring unit of the formula (I). Also, the polymer material may contain, in addition to a major portion consisting of one or more imide polymers having at least 90 molar % of a recurring unit of the formula (I), a minor portion consisting of one or more other types of aromatic imide polymers.

In the process of the present invention, it is preferable that the spinning dope solution contains the polymer material in a total content of from 5 to 30% by weight, more preferably, from 7 to 20% by weight, based on the entire weight of the spinning dope solution. Also, it is preferable that the spinning dope solution is a homogeneous solution and exhibits a rotation viscosity of at least 500 centipoises, more preferable, from 10 to 100,000 poises, at a temperature of from 0° to 150° C., particularly, from 20° to 120° C., at which the spinning dope solution is extruded.

In the process of the present invention, the spinning dope solution is extruded through at least one spinning hole, and the resultant filamentary stream of the dope solution is introduced into a wet solidifying procedure in which the filamentary stream is coagulated in a coagulating liquid compatible with the phenolic compound but not with the polymer material. The extruded filamentary stream of the dope solution may be subjected to a dry solidifying procedure in which the solvent in the filamentary stream is evaporated. The resultant undrawn filament is subjected to a drawing procedure at a draw ratio of from 1.5 to 5 at a temperature of from 20° to 600° C.

In the present invention, the spinning dope solution can be shaped into at least one filament by any conventional spinning method. For example, the spinning dope solution of the present invention is filtered and, then, degassed at a temperature of from 20° to 150° C. Subsequently, the degassed dope solution is extruded through a spinneret having one or more spinning holes, each hole having an internal diameter of from about 0.05 to 1 mm, preferable, from 0.1 to 0.8 mm, at an extrusion temperature of from about 0° to 150° C., preferably, from 20° to 120° C., at a back pressure of from about 0.1 to 20 kg/cm$^2$G preferably, from 0.5 to 15 kg/cm$^2$G. Thus, filamentary streams of the dope solution are continuously formed.

Then, the filamentary streams of the dope solution are immediately introduced into a coagulating liquid maintained at a temperature of from about −10° to 60° C. to coagulate them (a wet coagulating procedure). Alternatively, the filamentary streams of the dope solution are first caused to travel in air and then, introduced into a coagulating liquid maintained at a temperature of from about −10° to 60° C. to coagulate them (a dry jet-wet spinning procedure). As a result of the above mentioned coagulating procedures, solidified filaments are obtained.

Also, the acid filaments may be obtained from the filamentary streams of the dope solution by causing the filamentary streams to travel in air and, then, heating the filamentary streams at an elevated temperature to evaporate the solvent therefrom, thereby solidifying it (a dry spinning procedure). In the case where the dry solidifying procedure is employed, it is preferable that the dope solution is extruded at a high temperature of from about 60° to 150° C., more preferably, from 70° to 130° C.

The coagulating liquid usable for the above mentioned wet and dry jet-wet spinning procedures should be compatible with the phenolic compound, but not with the polymer material. The coagulating liquid comprises at least one member selected from the group consisting of water; lower aliphatic alcohols having 1 to 5 carbon atoms, for example, methyl alcohol and propyl alcohol; lower aliphatic ketones having 3 to 5 carbon atoms, for example, acetone, methyl ethyl ketone, diethyl ketone and methyl propyl ketone; tetrahydrofuran; dioxane; aliphatic ethers such as ethyleneglycol monomethylether; aliphatic amides such as dimethyl acetamide and dimethyl formamide and; dimethylsulfoxide. The most preferable coagulating liquid is the lower aliphatic alcohols such as methyl alcohol and ethyl alcohol.

In the case where the wet or semi-wet coagulating procedure is employed, it is preferable that the extruded filaments are repeatedly immersed several times into the coagulating liquid so that the solvent, e.g. phenolic compound, is completely extracted out from the extruded filaments.

The spinning operation in the process of the present invention can be carried out, for example, by using an apparatus as shown in FIGS. 1 and 2.

Referring to these drawings, a spinning dope solution is supplied into a spinning head 1 having a spinning nozzle (spinneret) 2. Then, the spinning dope solution is extruded through the nozzle 2 at a temperature of from 0° to 150° C., at a back pressure of from 0.5 to 1.5 kg/cm$^2$G, by using a pressurized nitrogen gas supplied through a nitrogen gas line 9. Immediately after the extrusion procedure, the filamentary stream of the dope solution are first-coagulated by passing through a coagulating conduit 3 filled with a coagulating liquid which flows along the direction of travel of the filamentary stream. Then, the first-coagulated filament is supplied into a coagulating bath 4 filled with a coagulating liquid and subjected to a second coagulation procedure in which the filament is repeatedly immersed in the coagulating liquid. The second coagulation procedure is carried out by alternately wrapping the filament on a pair of rolls 5 and 6 provided in the coagulating bath and by reciprocating the filament between these rolls. Finally, the coagulated filament is taken up on a wind-up roll 7. Thus, polyimide filament is obtained.

The coagulating liquid flowing within the conduit 3 may be a circulated via a circulating line 10 by means of a circulating pump 8.

The filament may be taken up at a speed of from 1 to 200 m/min, preferably, from 5 to 100 m/min.

It is preferably in the present invention that the second-coagulated filament is drawn at an elevated temperature of about 250° C. or more. This drawing operation is effective for imparting high mechanical strength to the polyimide filament. Also, it is preferable that the draw ratio is in a range of from about 2 to 5, more preferably, from 2.5 to 4.

The drawing operation is preferably carried out by using ether a hot plate contact method in which the filament is drawn in contact with a hot plate heated to an elevated temperature or an infrared heating method in which the filament is drawn while being heated by infrared rays. The drawing operation may be carried out in any type of atmosphere such as air or inert gas. However, high temperature drawing is preferably carried out in an inert gas atmosphere.

The polyimide filaments produced by the process of the present invention exhibit a high mechanical strength, excellent resistance to heat and chemicals and an excellent electrical insulating property. Therefore, the polyimide filament of the present invention can be used in the applications of high temperature electrical insulating materials, cable coverings, protective clothing, curtains, packing and linings.

Examples of the present invention and comparative examples will be described hereunder.

In the examples and comparative examples, the denier of the filament was measured by a denier measuring machine (trade name; Dinicon, manufactured by Kyokko Seiko K.K.). Also, the tensile strength of the individual filament was determined by a tensile testing machine (trade name; TOM-5 type, manufactured by Shinko Tsushin Kogyo K.K.) using a gauge length of 20 mm and a stretching speed of 10 mm/min.

EXAMPLES 1 THROUGH 7 AND COMPARISON EXAMPLE 1

[Preparation of imide polymers by a two-step method]

In each of Examples 1 through 7 and Comparison Example 1, a mixture of 240 millimoles of 3,3',4,4'-biphenyl tetracarboxylic dianhydride 240 millimoles of 4,4'-diaminodiphenyl ether and 1670 g of dimethyl acetamide was placed in a separable flask with a stirrer and a conduit for introducing thereinto nitrogen gas. The mixture was subjected to a polymerization reaction at a temperature of 20° C. for 4 hours while flowing nitrogen gas through the flask, to prepare polyamic acid. The resultant polymerization mixture was cooled to a temperature of about 10° C. and, then, admixed with 800 ml of dimethyl acetamide, 600 ml of acetonitrile, 147 g of acetic anhydride and 114 g of pyridine. The admixture was homogenized by thoroughly stirring it, and, then, gradually heated to and maintained at a temperature of from about 25° to 30° C. for from about 20 to 30 minutes so as to allow the resultant aromatic imide polymer to precipitate in the form of fine particles from the polymerization mixture. Thereafter, the polymerization mixture was heated to a temperature of from 70° to 80° C. and maintained at this temperature for 30 minutes or more to complete the imidization reaction and the precipitation of the aromatic imide polymer.

The polymerization mixture containing the aromatic imide polymer powder was added to a large amount of methyl alcohol, and the admixture was filtered to separate the imide polymer powder. The imide polymer powder was thoroughly washed with methyl alcohol and, then, dried under a reduced pressure.

The resultant aromatic polyimide powder exhibited a degree of imidization of 95% or more and a logarithmic viscosity of 1.4, measured at a concentration of 0.5 g per 100 ml of a mixture of 4 parts by volume of P-chlorophenol and 1 part by volume of O-chlorophenol at a temperature of 30° C.

[Preparation of a dope solution]

10 parts by weight of the aromatic polyimide powder obtained above were suspended in 90 parts by weight of fused P-chlorophenol (PCP). The suspension was heated to a temperature of about 90° C. to dissolve the aromatic polyimide in the P-chlorophenol. Thus, a spinning dope solution of the aromatic polyimide uniformly dissolved in the P-chlorophenol was obtained. The polyimide dope solution was filtered under pressure at a temperature of about 120° C. The filtered dope solution was degassed under reduced pressure. The resultant degassed dope solution exhibited a rotation viscosity of 3,500 poises at a temperature of 60° C.

[Spinning]

The thus prepared dope solution was subjected to a spinning procedure by using a spinning apparatus as shown in FIGS. 1 and 2.

As is shown in the drawings, the dope solution was supplied into a spinning head 1 having a spinning nozzle 2 having one hole which has an internal diameter of 0.4 mm and a depth of 0.4 mm.

The dope solution was extruded at an extrusion rate of 0.26 g/min (0.208 cm$^3$/min) through the nozzle 2 at an extrusion temperature of 60° C. under a back pressure of 2 kg/cm$^2$ exerted by nitrogen gas, so as to prepare filamentary extrudates. Subsequently, the filamentary extrudates were allowed to pass through the coagulating conduit 3 while immersing them in a coagulating liquid consisting of methyl alcohol at a temperature of 7° C. The coagulating liquid was flowed along the direction of travel of the extrudates, so that the filamentary extrudates were first-coagulated. Then, the first-coagulated filaments were introduced into the coagulating bath 4 filled with a methyl alcohol at a temperature of from 10° to 12° C. In the coagulating bath 4, the filaments were alternately wrapped on the rolls 5 and 6 and reciprocated between these rolls, as shown in FIG. 2, so as to immerse the filaments in the coagulating liquid several times. Thus, the second coagulation of the filaments was accomplished. Finally, the second-coagulated filaments were taken up on the wind-up roll 7 at the following speeds and draft ratios to obtain undrawn aromatic polyimide filaments:

| Take-up condition No. 1: | take-up speed: | 7.2 m/min, |
| | draft ratio: | 4.3 |
| Take-up condition No. 2: | take-up speed: | 13.3 m/min, |
| | draft ratio: | 8.0 |
| Take-up condition No. 3: | take-up speed: | 13.9 m/min, |
| | draft ratio: | 8.4 |

[Drawing]

The thus obtained undrawn filaments were drawn and heat-treated under conditions as shown in Table 1 to produce aromatic polyimide filaments.

The denier, tensile strength (g/d), ultimate elongation (%) and modulus of elasticity (g/d) of the resultant aromatic polyimide filaments are shown in Table 1.

[Drawing]

The thus prepared undrawn filaments were drawn

TABLE 1

| Item | Take-up condition for undrawn filament | Drawing condition | | Draw ratio | Heat treatment | | Properties of polyimide fiber | | | |
|---|---|---|---|---|---|---|---|---|---|---|
| | | Drawing method | Heating temperature (°C.) | | Temperature (°C.) | Time (min) | Denier | Tensile strength (g/d) | Ultimate elongation (%) | Modulus of elasticity (g/d) |
| Example 1 | No. 1 | Infrared heating | 400 | 3 | — | — | 4.9 | 10 | 17.3 | 117 |
| Comparison Example 1 | No. 2 | — | — | — | — | — | 16 | 2.2 | 110 | — |
| Example 2 | " | Hot plate heating | 370 | 2 | — | — | 6.3 | 7.2 | 13 | 98 |
| Example 3 | " | " | 370 | 3 | — | — | 4.4 | 11.8 | 12 | 170 |
| Example 4 | " | " | 370 | 3 | 450 | 10 | 4.7 | 11.3 | 11 | 150 |
| Example 5 | " | " | 400 | 3 | — | — | 4.7 | 12.5 | 14.7 | 150 |
| Example 6 | No. 3 | " | 250 | 2.4 | — | — | 5.5 | 8.9 | 6.8 | 150 |
| Example 7 | " | " | 400 | 2.7 | — | — | 5.7 | 10.1 | 15.6 | 120 |

EXAMPLES 8 THROUGH 11 AND COMPARISON EXAMPLE 2

[Preparation of aromatic imide polymer by a single step polymerization-imidization method]

In each of Examples 8 through 11 and Comparison Example 2, the same separable flask as that mentioned in Example 1 was charged with 25 millimoles of 3,3',4,4'-biphenyl tetracarboxylic dianhydride, 25 millimoles of 4,4'-diaminodiphenyl methane and 111 g of p-chlorophenol, and the temperature of the reaction mixture was raised from room temperature to 180° C. in 40 minutes and maintained at 180° C. for 4 hours, while flowing nitrogen gas through the flask to carry out polymerization and imidization reactions in a single step. A viscous aromatic imide polymer solution was obtained. The degree of imidization and the logarithmic viscosity of the aromatic imide polymer in the solution were 95% on more and 1.6, respectively.

[Preparation of a dope solution]

The thus prepared aromatic polyimide solution was heated to a temperature of about 110° C. and then, the solution was filtered under pressure. The filtered solution was degassed under reduced pressure to prepare a spinning dope solution for forming filaments. The dope solution exhibited a rotation viscosity of 2500 poises at a temperature of 60° C.

[Spinning]

Aromatic polyimide filaments were prepared from the thus prepared spinning dope solution in the same manner as those described in Example 1, except that the back pressure was 0.5 kg/cm$^2$G, the extrusion temperature was 97° C., the extrusion rate was 0.124 g/min (0.70/cm$^3$/min), the take-up speed was 13.0 m/min and the temperature of the first coagulating liquid was −2° to 0.° C.

under drawing conditions as shown in Table 2 to produce aromatic polyimide filaments.

The denier, tensile strength, ultimate elongation and modulus of elasticity of the resultant aromatic polyimide filaments are shown in Table 2.

TABLE 2

| Item | Drawing condition | | Properties of polyimide filament | | | |
|---|---|---|---|---|---|---|
| | Drawing temperature (°C.) | Draw ratio | Denier | Tensile strength (g/d) | Ultimate elongation (%) | Modulus of elasticity (g/d) |
| Comparison Example 2 | Undrawn | — | 7.7 | 1.6 | 130 | — |
| Example 8 | 200 | 4 | 2.0 | 7.3 | 10.8 | 98 |
| Example 9 | 350 | 3.2 | 2.8 | 6.1 | 19.3 | 62 |
| Example 10 | 400 | 3.6 | 2.1 | 7.4 | 18.1 | 63 |
| Example 11 | 450 | 3.2 | 2.6 | 6.5 | 24.8 | 50 |

EXAMPLES 12 THROUGH 17 AND COMPARISON EXAMPLE 3

[Preparation of imide polymers by a two-step polymerization-imidization method]

In each of Examples 12 through 17 and Comparison Example 3, the same separable flask as that mentioned in Example 1 was charged with 60 millimoles of 3,3',4,4'-biphenyl tetracarboxylic dianhydride, 60 millimoles of ortho-dianisidine and 291 g of N-methyl pyrrolidone, and the reaction mixture was subjected to a polymerization reaction at a temperature of 20° C. for 4 hours while flowing nitrogen gas through the flask, to prepare polyamic acid. The resultant polymerization mixture was cooled to a temperature of about 10° C. and, then, mixed with 250 ml of N-methyl pyrrolidone, 360 ml of acetic anhydride and 360 ml of pyridine. The mixture was homogenized by thoroughly stirring it, and, then, gradually heated to and maintained at a temperature of from about 25° to 30° C. for from about 20 to 30 minutes so as to allow the resultant aromatic imide polymer to precipitate in the form of fine particles from the polymerization mixture. Thereafter, the polymerization mixture was heated to a temperature of from 70° to 80° C., and that temperature was maintained for 30 minutes or more to complete the imidization reaction and the precipitation of the aromatic imide polymer.

The same separation procedure as that described in Example 1 was applied to the polymerization mixture to obtain the aromatic imide polymer powder.

The resultant aromatic imide polymer powder exhibited a degree of imidization of 95% or more and a logarithmic viscosity of 1.5.

13

[Preparation of a dope solution]

A dope solution for spinning was prepared in accordance with the same procedures as those described in Example 1, except that the aromatic polyimide powder obtained above was used. The resultant dope solution exhibited a rotation viscosity of 7000 poises at a temperature of 60° C.

[Spinning]

Undrawn aromatic polyimide filaments were prepared from the thus prepared dope solution by the same procedures as those described in Example 1, except that the back pressure was 0.65 kg/cm²G, the extrusion temperature was 92° C., the extrusion rate was 0.283 g/min (0.115 cm³/min), the take-up speed was 13 m/min, the temperature of the first coagulating liquid was 0° C. and the temperature of the second coagulating liquid was in a range of from 8° to 10° C.

[Drawing]

The thus prepared undrawn filaments were drawn under drawing conditions as shown in Table 3.

The properties of the resultant aromatic polyimide fibers are shown in Table 3.

TABLE 3

| | Drawing condition | | Properties of polyimide fiber | | |
|---|---|---|---|---|---|
| Item | Drawing temperature (°C.) | Draw ratio | Denier | Tensile strength (g/d) | Ultimate elongation (%) | Modulus of elasticity (g/d) |
| Comparison Example 3 | Undrawn | — | 8.6 | 4.4 | 2.5 | 120 |
| Example 12 | 300 | 1.5 | 4.0 | 9.9 | 2.4 | 430 |
| Example 13 | 350 | 1.9 | 3.4 | 13.1 | 2.3 | 580 |
| Example 14 | 400 | 2.4 | 3.2 | 12.2 | 2.2 | 610 |
| Example 15 | 450 | 2.0 | 3.5 | 13.7 | 2.5 | 620 |
| Example 16 | 500 | 1.7 | 3.6 | 16.2 | 2.8 | 640 |
| Example 17 | 550 | 1.8 | 3.3 | 17.4 | 3.0 | 650 |

We claim:

1. A process for producing aromatic polyimide filaments, comprising the steps of:
   (1) preparing a spinning dope solution of a polymer material consisting of at least one aromatic polyimide having at least 90 molar % of a recurring unit of the formula (I):

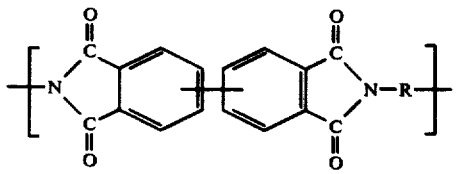

wherein R represents a divalent aromatic radical, in a solvent comprising, as a main component thereof, at least one phenolic compound;
   (2) extruding said spinning dope solution through at least one spinning hole to form at least one filamentary stream thereof,
   (3) solidifying said filamentary stream of said spinning dope solution to provide at least one undrawn aromatic polyimide filament, and;
   (4) drawing said undrawn filament at a temperature of from 20° to 600° C. at a draw ratio of from 1.5 to 5.0.

2. The process as claimed in claim 1, wherein the divalent aromatic group represented by R in the formula (I) is a residue of an aromatic diamine from which two amino groups are excluded.

3. The process as claimed in claim 1, wherein said aromatic polyimide has a logarithmic viscosity of from 0.3 to 7.0, determined at a concentration of 0.5 g per 100 ml of a mixture solvent of 4 parts by volume of P-chlorophenol and 1 part by volume of O-chlorophenol at a temperature of 30° C.

4. The process as claimed in claim 1, wherein said aromatic polyimide is a polymerization-and-imidization product of a tetracarboxylic acid component comprising at least 90 molar % of at least one biphenyl tetracarboxylic acid or its anhydride, salt or ester with a diamine component comprising at least one aromatic diamine of the formula (II):

$$H_2N-R-NH_2 \qquad (II)$$

wherein R is as defined above.

5. The process as claimed in claim 4, wherein said tetracarboxylic acid component is selected from the group consisting of 3,3',4,4'-biphenyl tetracarboxylic anhydride and 2,3,3',4'-biphenyl tetracarboxylic anhydride.

6. The process as claimed in claim 4, wherein said tetracarboxilic acid component contains 10 molar % or less of at least one member selected from the group consisting of pyromellitic acid, 3,3',4,4'-benzophenone tetracarboxylic acid, 2,2-bis (3,4-dicarboxyphenyl) propane, bis (3,4-dicarboxyphenyl) sulfone, bis (3,4-dicarboxyphenyl) ether, bis (3,4-dicarboxyphenyl) thioether, butane tetracarboxylic acid, and anhydrides, salts and esters of the above-mentioned compounds.

7. The process as claimed in claim 4, wherein said aromatic diamine is selected from the group consisting of those of the formulae (III) and (IV):

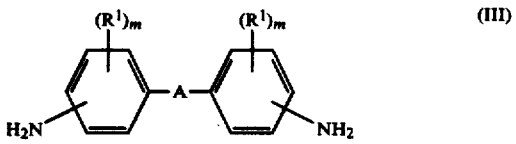

and

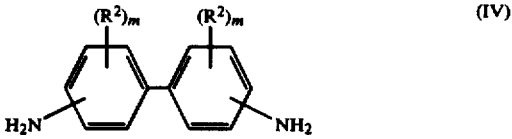

wherein $R_1$ and $R_2$ respectively represent, independently from each other, a member selected from the group consisting of hydrogen atom, lower alkyl radicals having 1 to 3 carbon atoms and lower alkoxyl radicals having 1 to 3 carbon atoms; A represents a divalent linking member selected from the class consisting of —O—, —S—, —C—, —SO$_2$—, —SO—, —CH$_2$— and —C(CH$_3$)$_2$—, and m represents an integer of from 1 to 4.

8. The process as claimed in claim 1, wherein said phenolic compound has a melting point of 100° C. or less and a boiling point of about 300° C. or less under atmospheric pressure.

9. The process as claimed in claim 1, wherein said phenolic compound is selected from the group consisting of phenol, alkyl-substituted monohydric phenol compounds and halogenated monohydric phenol compounds.

10. The process as claimed in claim 9, wherein said alkyl-substituted monohydric phenol compound is selected from the group consisting of O-, m- and P-cresols, 3,5-xylenol, carvacrol and thymol.

11. The process as claimed in claim 9, wherein said monohydric halogenated phenol compound is selected from the group consisting of those of the formula (VII):

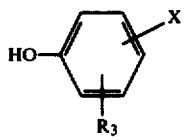
(VII)

wherein R$^3$ represents a member selected from the group consisting of hydrogen atom and alkyl radicals having 1 to 3 carbon atoms and X represents halogen atoms.

12. The process as claimed in claim 1, wherein said spinning dope solution contains 5 to 30% by weight of said polymer material.

13. The process as claimed in claim 1, wherein said spinning dope solution has a rotation viscosity of at least 500 centiposes at a temperature of from 0° to 150° C.

14. The process as claimed in claim 1, wherein said solidification is carried out by introducing said filamentary stream of said spinning dope solution into a coagulating liquid which is compatible with said solvent but not compatible with said polymer material, to coagulate said filamentary stream of said spinning dope solution.

15. The process as claimed in claim 14, wherein said coagulating liquid comprises at least one member selected from the groups consisting of water, lower aliphatic alcohols having 1 to 5 carbon atoms, lower aliphatic ketones having 3 to 5 carbon atoms, tetrahydrofuran, dioxane, ethyleneglycol monomethylether, dimethylacetamide, dimethylformamide and dimethylsulfoxide.

16. The process as claimed in claim 1, wherein said solidification is carried out by evaporating away said solvent from said filamentary stream of said spinning dope solution.

17. The process as claimed in claim 16, wherein before said solidification step, said spinning dope solution is extruded at a temperature of from 60° to 150° C.

18. The process as claimed in claim 16, wherein said evaporation is carried out at a temperature of from 60° to 400° C.

19. The process as claimed in claim 14, wherein said coagulation is carried out in two or more stages.

20. The process as claimed in claim 1, wherein said drawing temperature is 250° C. or more.